United States Patent
Peng et al.

(10) Patent No.: US 8,289,691 B2
(45) Date of Patent: Oct. 16, 2012

(54) MOUNTING APPARATUS FOR DATA STORAGE DEVICE

(75) Inventors: Wen-Tang Peng, Taipei Hsien (TW); Jia-Qi Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 517 days.

(21) Appl. No.: 12/558,581

(22) Filed: Sep. 14, 2009

(65) Prior Publication Data

US 2010/0288898 A1 Nov. 18, 2010

(30) Foreign Application Priority Data

May 12, 2009 (CN) .......................... 2009 1 0302230

(51) Int. Cl.
*G06F 1/16* (2006.01)
(52) U.S. Cl. .............. 361/679.33; 361/679.39; 361/747; 312/223.1; 248/27.3
(58) Field of Classification Search ................. 248/27.3, 248/298.1, 222.11, 27.1; 361/725, 726, 727, 361/679.33, 679.39, 747, 754; 312/223.1, 312/223.2
See application file for complete search history.

(56) References Cited

U.S. PATENT DOCUMENTS

| | | | |
|---|---|---|---|
| 5,793,607 A | | 8/1998 | Karidis et al. |
| 6,313,985 B1 * | | 11/2001 | Chen et al. ............... 361/679.33 |
| 7,031,150 B2 * | | 4/2006 | Chen et al. ............... 361/679.33 |
| 7,068,502 B2 * | | 6/2006 | Chen et al. ............... 361/679.39 |
| 7,327,565 B2 * | | 2/2008 | Chen et al. ............... 361/679.33 |
| 7,345,237 B2 * | | 3/2008 | Chen et al. ..................... 174/50 |
| 7,408,770 B2 * | | 8/2008 | Peng et al. ............... 361/679.33 |
| 7,428,147 B2 * | | 9/2008 | Lin ......................... 361/679.33 |
| 7,448,702 B2 * | | 11/2008 | Chen et al. ................. 312/223.2 |
| 7,477,512 B2 * | | 1/2009 | Sung ....................... 361/679.33 |
| 7,489,504 B2 * | | 2/2009 | Chen et al. ............... 361/679.37 |
| 7,542,281 B2 * | | 6/2009 | Liang et al. .............. 361/679.39 |
| 7,609,509 B2 * | | 10/2009 | Wu et al. .................. 361/679.33 |
| 7,611,100 B2 * | | 11/2009 | Peng et al. .................... 248/27.1 |
| 7,679,896 B2 * | | 3/2010 | Deng et al. ............... 361/679.33 |
| 7,823,934 B2 * | | 11/2010 | Huang et al. .................. 292/143 |
| 7,841,565 B2 * | | 11/2010 | Peng et al. .................... 248/27.1 |
| 8,061,535 B2 * | | 11/2011 | Cheng-Yuan et al. .......... 211/26 |
| 2003/0184964 A1 * | | 10/2003 | Neukam et al. ................ 361/685 |
| 2005/0078445 A1 * | | 4/2005 | Chen et al. ..................... 361/685 |
| 2006/0227502 A1 * | | 10/2006 | Cheng ........................... 361/685 |
| 2007/0035920 A1 * | | 2/2007 | Peng et al. .................... 361/685 |
| 2011/0049317 A1 * | | 3/2011 | Peng et al. ................. 248/231.9 |

FOREIGN PATENT DOCUMENTS

CN 1160239 A 9/1997
CN 201035479 Y 3/2008

* cited by examiner

*Primary Examiner* — Kimberly Wood
(74) *Attorney, Agent, or Firm* — Altis Law Group, Inc.

(57) ABSTRACT

A mounting apparatus receives a data storage device with a plurality of posts. The mounting apparatus includes a bracket, and a latching unit mounted to the bracket. The latching unit includes a fixing tray, a sliding member slidably mounted in the fixing tray, and a resisting member mounted to the sliding member and resisting the post. When the sliding member is slid in the fixing tray along a first direction to resist the resisting member, the resisting member is moved into the fixing tray along a second direction perpendicular to the first direction. When the sliding member is slid in the fixing tray along a third direction opposite to the first direction, the resisting member is moved outside the fixing tray along a fourth direction opposite to the second direction.

16 Claims, 9 Drawing Sheets

MOUNTING APPARATUS FOR DATA STORAGE DEVICE

BACKGROUND

1. Technical Field

The disclosure relates to mounting apparatuses for data storage devices, and particularly to a mounting apparatus that readily secures a plurality of data storage devices in a computer enclosure.

2. Description of Related Art

Generally speaking, when a computer is assembled, a bracket is mounted in a computer enclosure, to which data storage devices will be attached, often by screws. This methodology can be tedious and time-consuming. Moreover, in this process, one or more screws can easily fall into the crowded interior of the computer enclosure, thus requiring a difficult retrieval.

DETAILED DESCRIPTION

Figure 1:
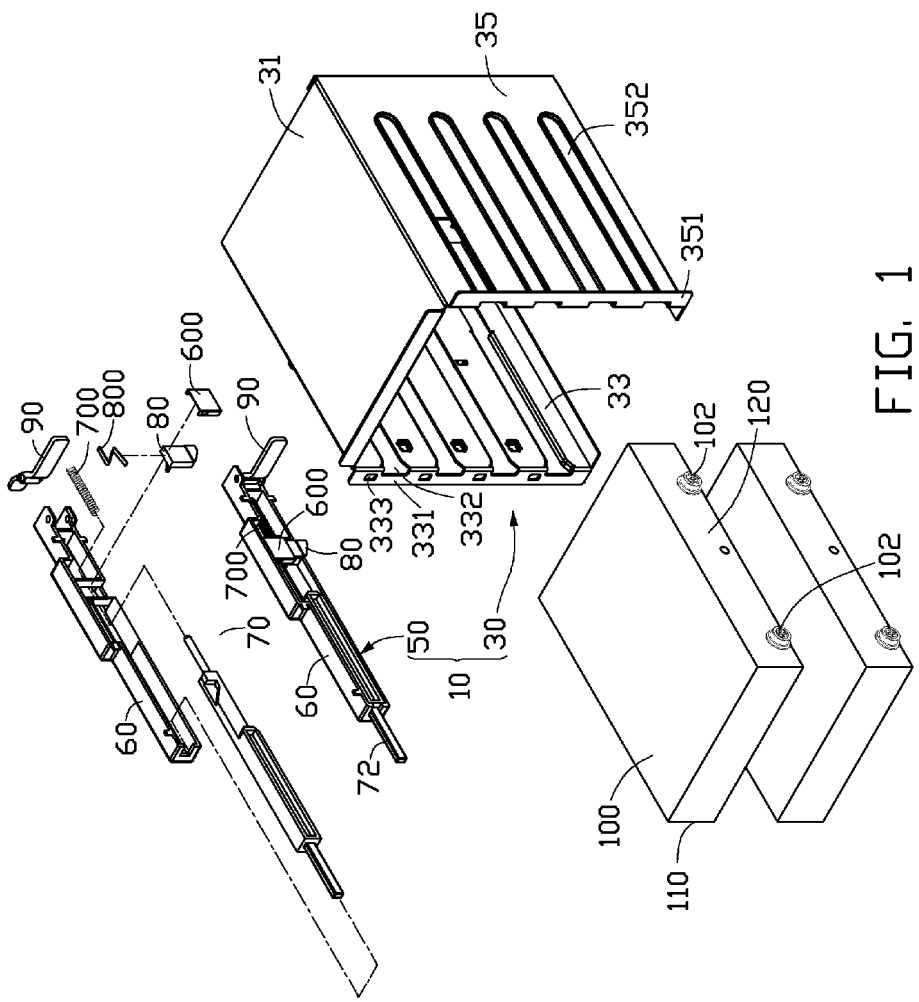
FIG. 1 is an exploded, isometric view of an exemplary embodiment of a mounting apparatus with two data storage devices, the mounting apparatus including a latching unit.
Figure 2:
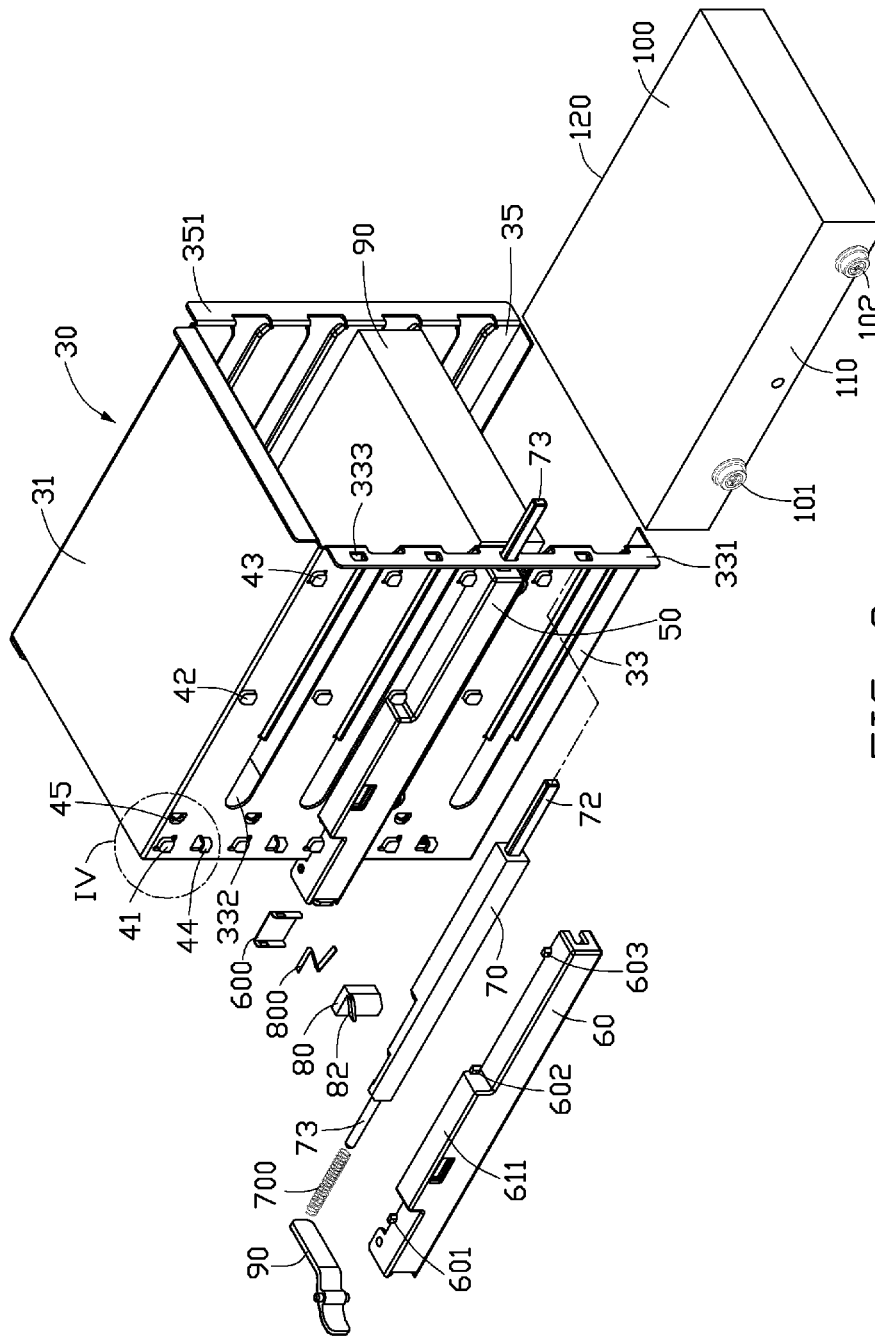
FIG. 2 is a partially assembled, isometric view of FIG. 1, but viewed from another perspective.

Referring to FIGS. 1 and 2, an exemplary embodiment of a mounting apparatus 10 is provided to receive at least one data storage device 100. In this embodiment, the mounting apparatus 10 receives two data storage devices 100, each including a first sidewall 110 and a second sidewall 120 opposite to the first sidewall 110. A first post 101 and a second post 102 protrude from the first sidewall 110, and a plurality of second posts 102 extend from the second sidewall 120. The first post 101 is situated adjacent to a rear end of the first sidewall 110, and the second post 102 is situated adjacent to a front end of the first sidewall 110. In this embodiment, the first and second posts 101 and 102 are heads of screws mounted to the data storage devices 100.

The mounting apparatus 10 includes a bracket 30 for receiving the data storage devices 100, and two latching unit 50.

The bracket 30 is generally n-shaped, and includes a top plate 31, a first side plate 33 and a second side plate 35 extending perpendicular from opposite sides of the top plate 31.

Figure 3:
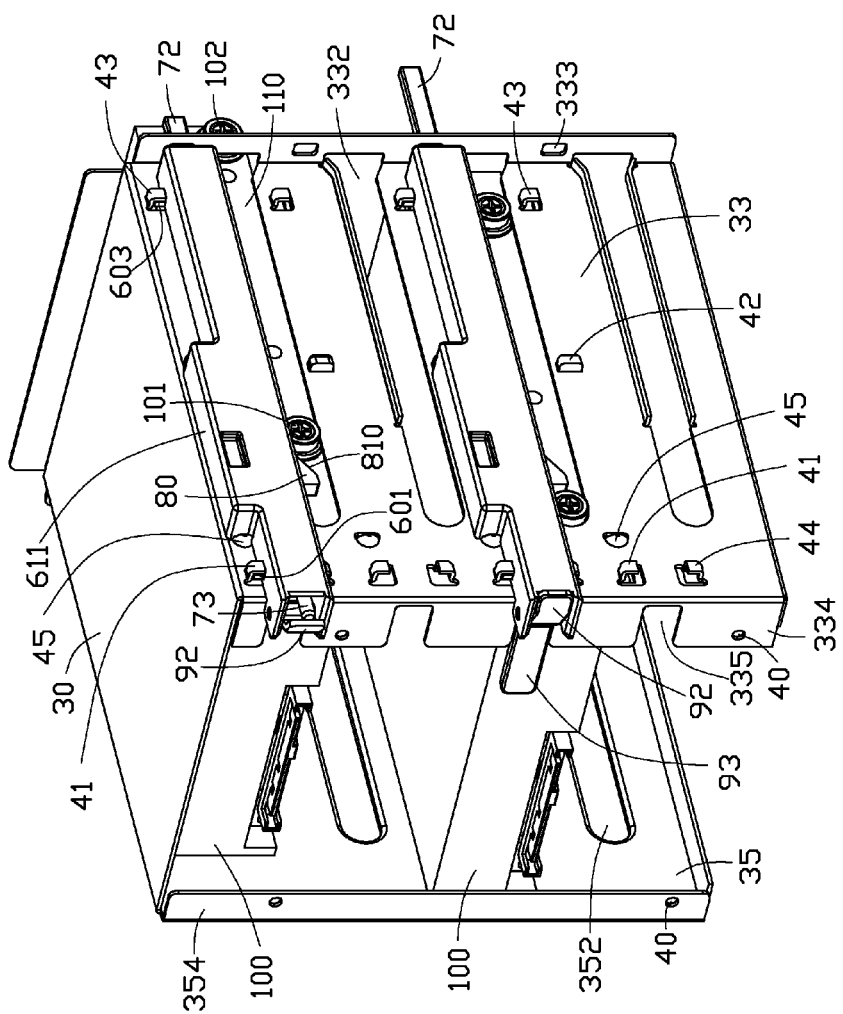
FIG. 3 is an assembled, isometric view of the mounting apparatus of FIG. 2, but viewed from another perspective.
Figure 4:
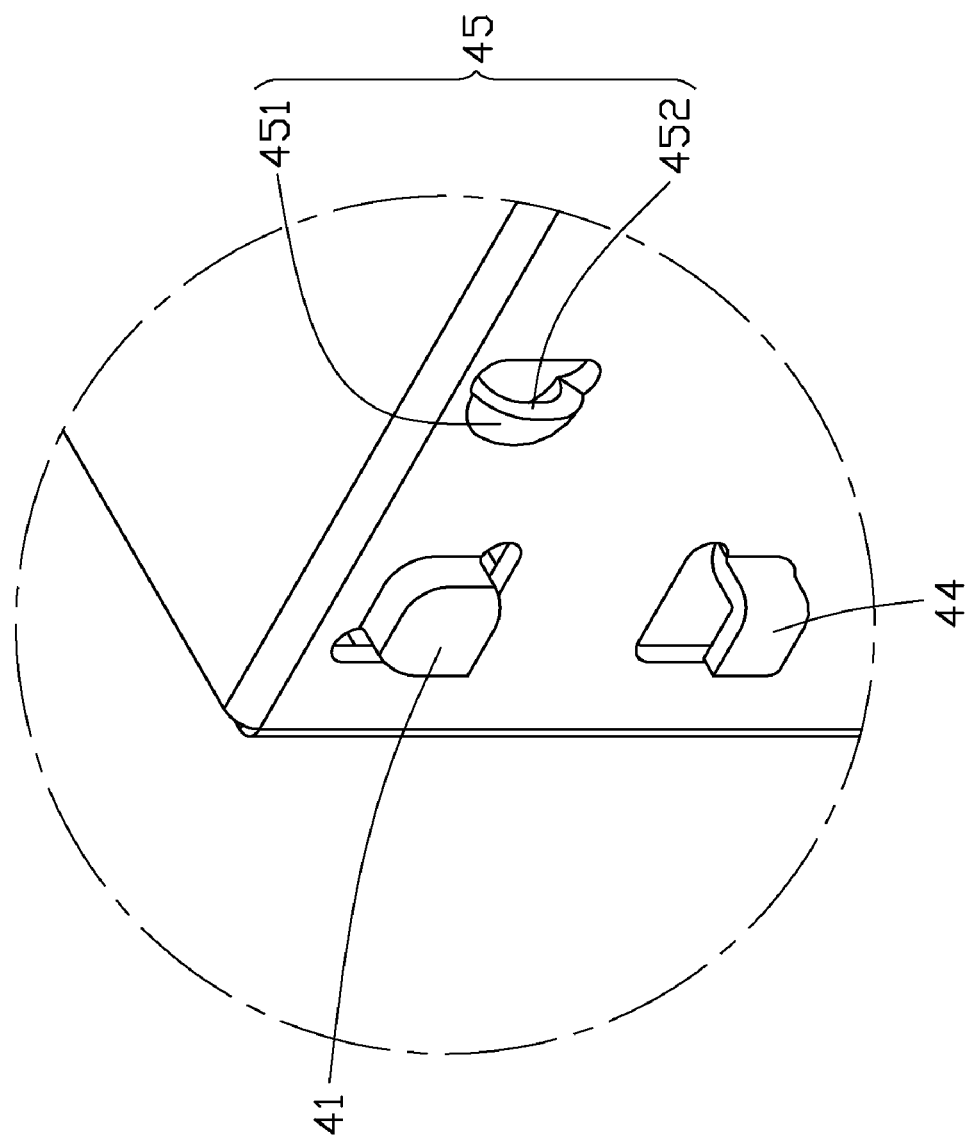
FIG. 4 is an enlarged view of the circled portion IV of FIG. 2.

A mounting tab 331 extends perpendicular from a front end of the first side plate 33. The mounting tab 331 defines a plurality of through holes 333. Referring to FIG. 3, a resisting tab 334 extends perpendicular inward from a rear end of the first side plate 33. The resisting tab 334 defines a plurality of receiving cutouts 335, and a plurality of fixing holes 40 for fixing the resisting tab 334 to an enclosure (not shown). The first side plate 33 transversely defines a plurality of sliding grooves 332, parallel to the top plate 31 and extending through the mounting tab 331. Each sliding groove 332 is located between two corresponding neighboring through holes 333. A first clipping portion 41, a second clipping portion 42, and a third clipping portion 43, in alignment with one another, protrude from the first side plate 33, above the corresponding sliding groove 332. The first and third clipping portions 41 and 43 are respectively located adjacent to the rear end and the front end of the first side plate 33. A fourth clipping portion 44 below and opposite to the first clipping portion 41 protrudes from the first side plate 33. A cambered fixing portion 45 protrudes from the first side plate 33, and between the first and second clipping portions 41, 42. Referring to FIG. 4, the fixing portion 45 includes a curved guiding surface 451, and a resisting end 452 perpendicular to the first side plate 33.

A flange 351 extends out from a front end of the second side plate 35, and a fixing flange 354 (shown in FIG. 3) extends inward from a rear end of the second side plate 35. The fixing flange 354 defines a plurality of fixing holes 40 for fixing the fixing flange 354 to the enclosure. A plurality of mounting grooves 352 is defined in the fixing flange 354, correspondingly aligning with the corresponding sliding grooves 332 of the first side plate 33. Each mounting groove 352 extends transversely through the flange 351.

Figure 5:
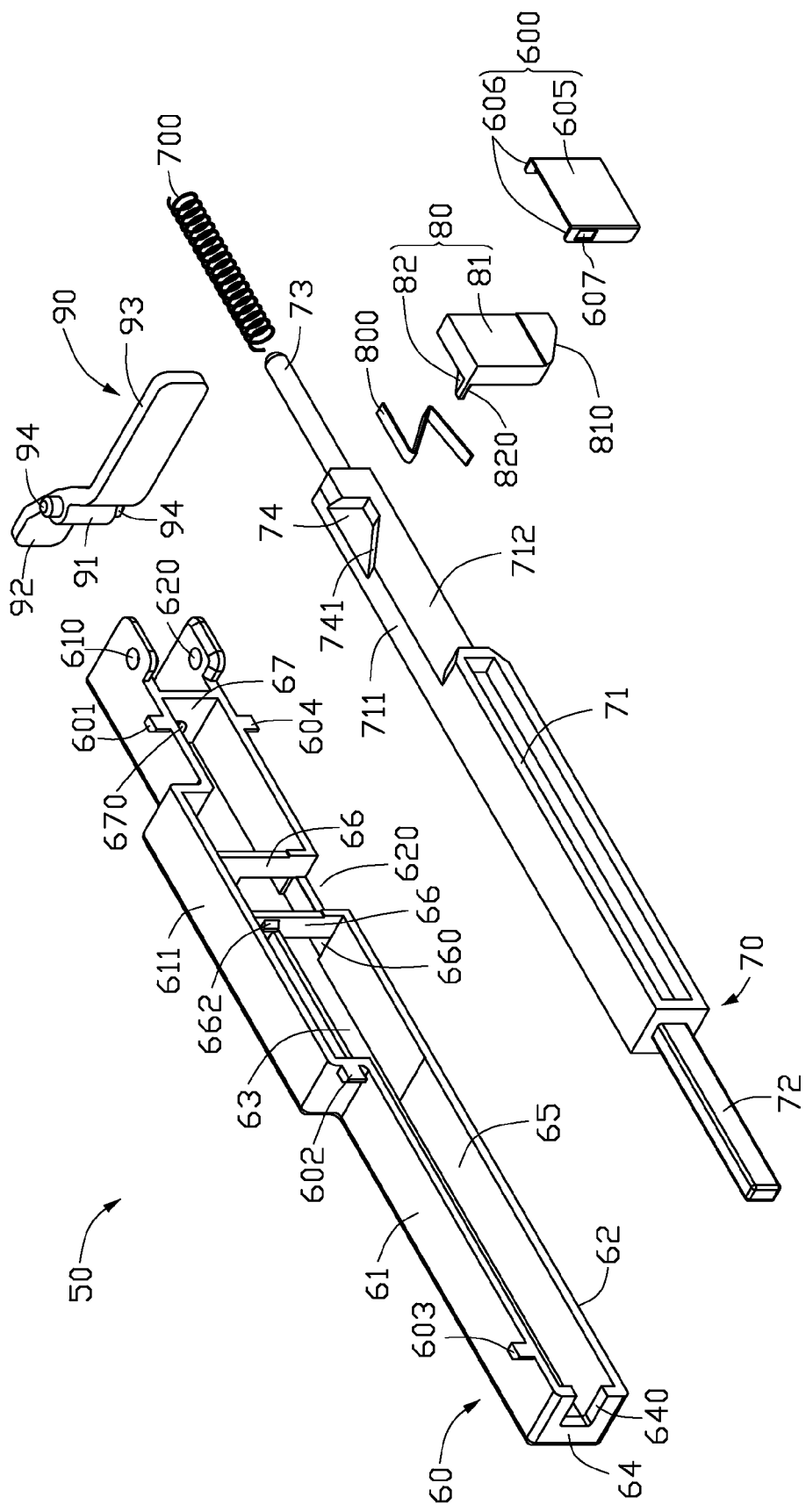
FIG. 5 is an enlarged view of the latching unit of FIG. 1.

Referring to FIG. 5, each latching unit 50 includes a fixing tray 60, a fastening member 600, a sliding member 70, a spring 700, a resisting member 80, a substantially Z-shaped resilient member 800, and a pushing member 90.

The fixing tray 60 includes a side panel 63, a top panel 61 and a bottom panel 62 correspondingly extending from a top side and a bottom side of the side panel 63, and a fixing wall 64 connected to corresponding first ends of the side panel 63, the top panel 61, and the bottom panel 62. A protrusion 611 protrudes from a middle of the top panel 61. A fixing post 602 extends towards the fixing wall 64 from a first end of the protrusion 611, parallel to the top panel 61. A first fixing peg 601 and a second fixing peg 603 protrude from the first end and a second end opposite to the first end of the top panel 61. A third fixing peg 604 extends from the bottom panel 62, in alignment with the first fixing peg 601. Two aligned shaft holes 610, 620 are correspondingly defined in the second ends of the top panel 61 and the bottom panel 62. An opening 640 is defined in the fixing wall 64. The top panel 61, the side panel 63, and the bottom panel 62 together form a holding space 65 for receiving the sliding member 70. Two parallel fixing boards 66 are formed in the holding space 65, parallel to the fixing wall 64 and connected to the protrusion 611 and the bottom panel 62. A sliding slot 660 is defined in each fixing board 66, and extends to the side panel 63. A clamping protrusion 662 extends from a side away from the other fixing board 66 of each fixing board 66, parallel to the fixing wall 64. A resisting board 67 defining a through hole 670 is formed in the holding space 65, and located between the first fixing peg 601 and the shaft hole 610.

The sliding member 70 includes a sliding body 71, a pushing portion 72 extending from a first end of the sliding body 71, and a mounting shaft 73 extending from a second end opposite to the first end of the sliding body 71. A mounting groove 74 is defined in the sliding body 71, adjacent to the mounting shaft 73. The mounting groove 74 includes an angled surface 741, away from the mounting shaft 73.

The resisting member 80 includes a main body 81, and an angled rim 82 extending from one side of the main body 81. The main body 81 includes an angled guiding surface 810, and the angled rim 82 includes a resisting surface 820.

The fastening member 600 includes a cover 605 and two fixing flanges 606 extending from opposite ends of the cover 605. Each fixing flange 606 defines a fixing hole 607, for fixing the fastening member 600 to the fixing boards 66 of the fixing tray 60.

The pushing member 90 includes a pivoting portion 91, and a first pushing portion 92 and second pushing portion 93 extending from opposite sides of the pivoting portion 91. Two pivoting shafts 94 extend from a top and a bottom of the pivoting portion 91, respectively.

During assembly of each latching unit 50, the spring 700 fits about the mounting shaft 73 of the sliding member 70. The sliding member 70 is received in the holding space 65 of the fixing tray 60, with the mounting shaft 73 together with the spring 700 passing through the sliding slots 660 of the fixing tray 60, and the mounting shaft 73 passing through the through hole 670 of the fixing tray 60. After the sliding member 70 is received in the holding space 65, the pushing portion 72 of the sliding member 70 is slidably engaged in the opening 640 of the fixing tray 60. Accordingly, opposite ends of the spring 700 resist the sliding body 71 of the sliding member 70 and the resisting board 67 of the fixing tray 60. The mounting groove 74 of the sliding member 70 is located between the fixing boards 66. The angled rim 82 of the resisting member 80 is received in the mounting groove 74 of the sliding member 70. Therefore, the resisting surface 820 of the angled rim 82 resists the angled surface 741 of the mounting groove 74, and opposite sidewalls of the main body 81 of the resisting member 80 abut the fixing boards 66 respectively. The resilient member 800 is received in the holding space 65, with two ends of the resilient member 800 resisting the protrusion 611 of the fixing tray 60 and a top of the main body 81. The fixing holes 607 of the fastening member 600 engage the clamping protrusions 662 of the fixing boards 66, correspondingly. The fastening member 600 is thereby fixed to the fixing tray 60, and the cover 605 of the fastening member 600 resists the main body 81. The pivoting shafts 94 of the pushing member 90 pivotally engage the shaft holes 610 and 620 of the fixing tray 60, correspondingly. The pushing member 90 is thus pivotally mounted to the fixing tray 60, with the second pushing portion 93 away from the side panel 63 of the fixing tray 60.

Referring to FIG. 3, in assembly of each latching unit 50 to the bracket 30, the pushing portion 72 of the latching unit 50 is retracted into the holding space 65 of the latching unit 50, such that the spring 700 is deformed. The latching unit 50 is mounted to an optional sliding groove 332 of the first side plate 33 of the bracket 30, and situated between the first and fourth clipping portions 41 and 44, with the holding space 65 facing the first side plate 33. Thus, the pushing member 90 faces the resisting tab 334 of the bracket 30. The fixing portion 45 of the bracket 30 is received in the holding space 65. The pushing portion 72 is in alignment with one of the through holes 333 of the bracket 30. The pushing portion 72 is released, and the spring 700 restores to drive the pushing portion 72 through the opening 640 of the fixing tray 60 and one of the through holes 333 in that order. When the latching unit 50 is moved towards the mounting tab 331 of the bracket 30, the first end of the protrusion 611 of the latching unit 50 is moved beyond the guiding surface 451 of the fixing portion 45. Accordingly, the first end of the protrusion 611 resists the resisting end 452 of the fixing portion 45, and the fixing post 602 of the latching unit 50 is clamped in the second clipping portion 42 of the bracket 30. Correspondingly, the first fixing peg 601, the second fixing peg 603, and the third fixing peg 604 of the latching unit 50 are clamped in the first, third, and fourth clipping portions 41, 43, and 44 of the bracket 30, respectively. Thus, the second portion 93 of the pushing member 90 is received in the corresponding receiving cutout 335 of the resisting tab 334 of the bracket 30.

Figure 6:
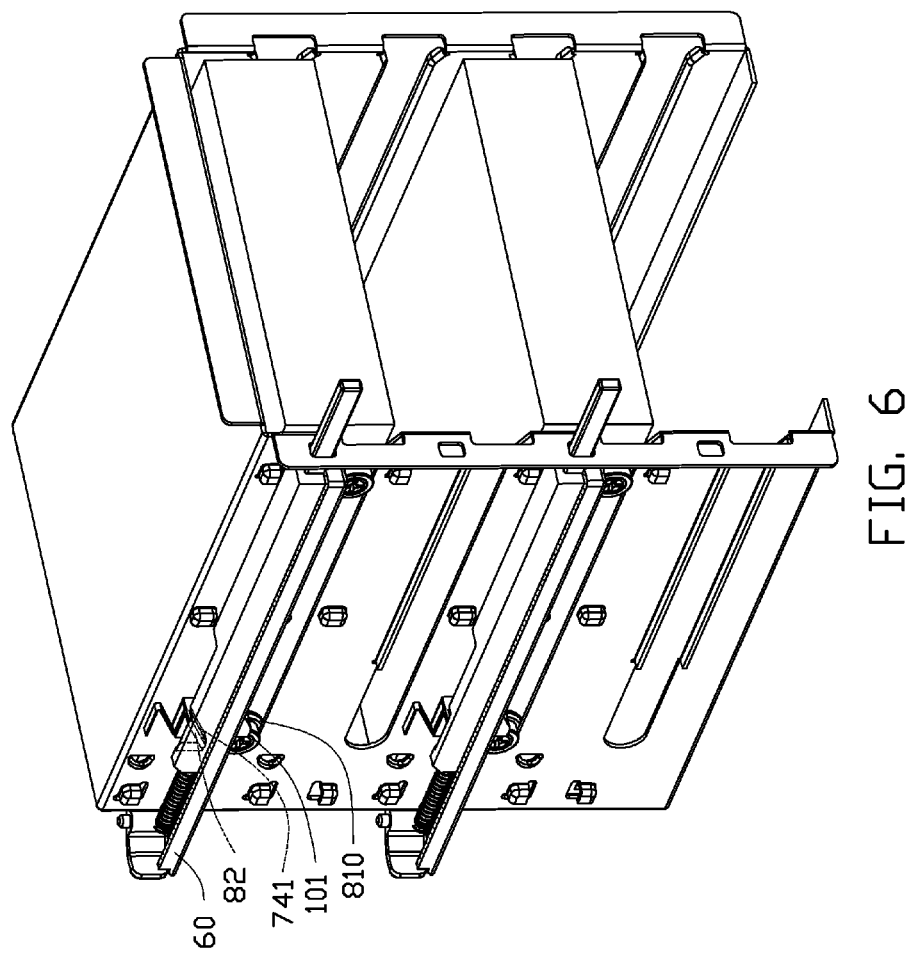
FIG. 6 is a partially assembled, partially sectional, isometric view of FIG. 3, but viewed from another perspective and showing a using state.
Figure 7:
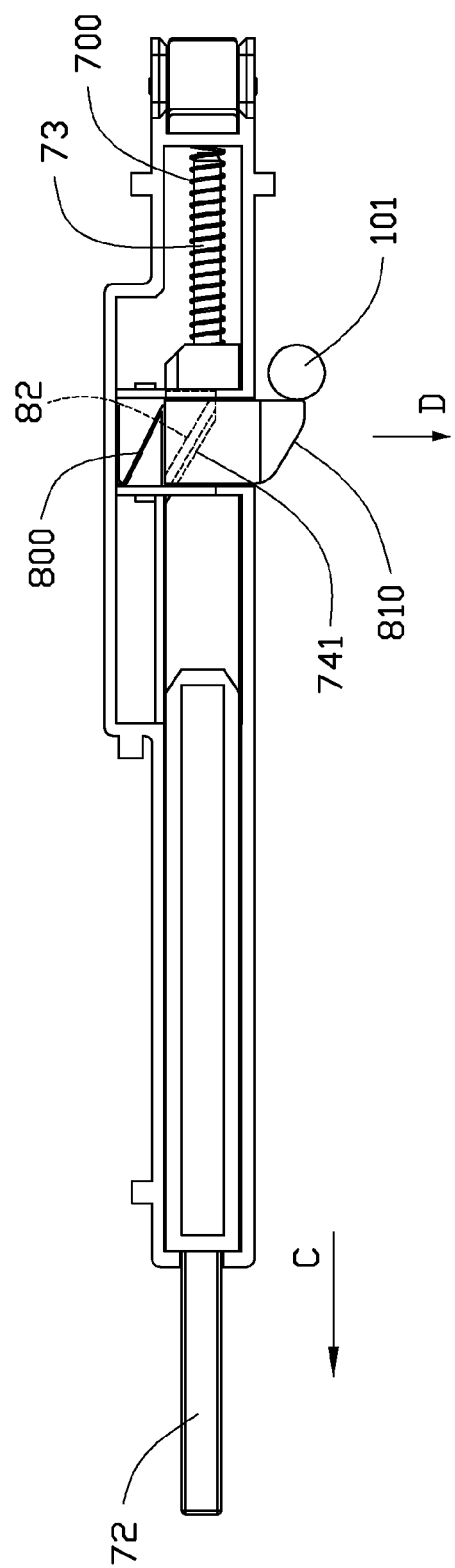
FIG. 7 is a side plan view of a latching unit and a post of the data storage device of FIG. 6.

Referring to FIG. 3, in use, each data storage device 100 is pushed into the bracket 30, and moved towards the resisting tab 334 of the bracket 30, with the first and second posts 101, 102 of the first sidewall 110 of the data storage device 100 sliding in the corresponding sliding groove 332 of the first side plate 33 of the bracket 30, and the plurality of second posts 102 of the second sidewall 120 of the data storage device 100 sliding in the corresponding mounting groove 352 of the second side plate 35 of the bracket 30. When the first post 101 is moved to resist the guiding surface 810 of the resisting member 80 of the latching unit 50, the resisting member 80 is moved into the holding space 65 of the latching unit 50. As a result, the resilient member 800 of the latching unit 50 is deformed. The first post 101 is moved over the guiding surface 810, the elasticity of the resilient member 800 moves the resisting member 80 to the outside of the holding space 65 along a direction indicated by a vertical arrowhead D, to prevent the data storage device 100 from disengaging from the bracket 30, as shown in FIG. 6 and FIG. 7. The pushing portion 72 moves out along a direction indicated by a horizontal arrowhead C.

Figure 8:
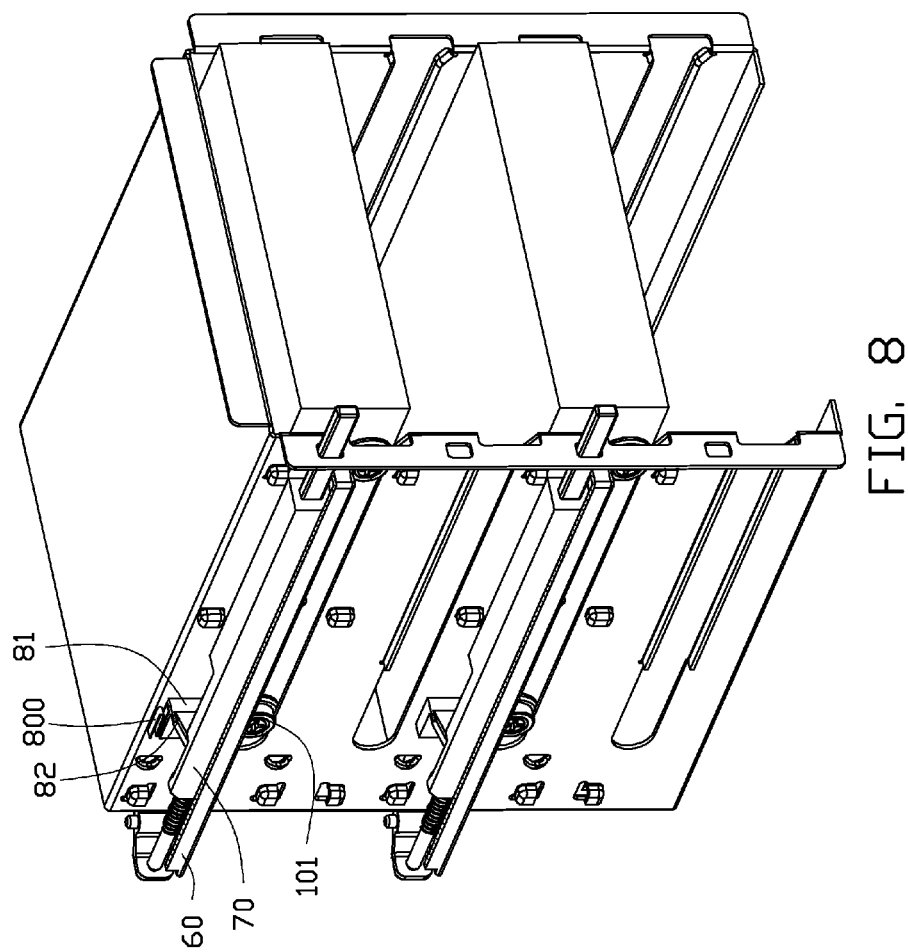
FIG. 8 is a partially assembled, partially sectional, isometric view of FIG. 3, but viewed from another perspective and showing another using state.
Figure 9:
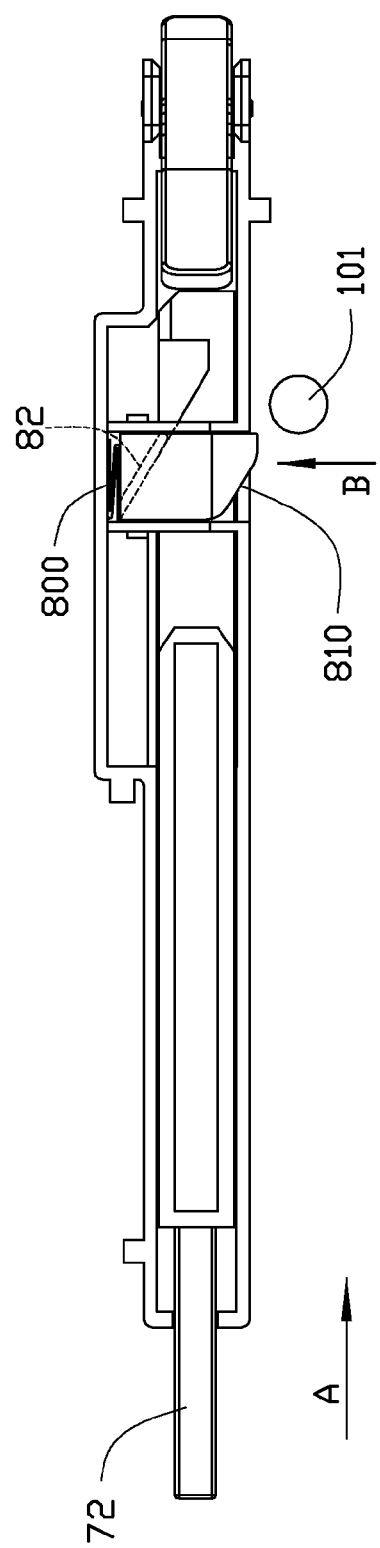
FIG. 9 is a side plan view of the latching unit and the post of the data storage device of FIG. 8.

Referring to FIG. 8 and FIG. 9, in removal of each data storage device 100 from the bracket 30, the pushing portion 72 of the latching unit 50 is slid in the holding space 65 of the fixing tray 60 of the latching unit 50 along an arrowhead direction A, whereby a distal end of the mounting shaft 73 is moved to the first pushing portion 92 of the pushing member 90 of the latching unit 50. As a result, the pushing member 90 is rotated, as is, in turn, the second pushing portion 94, to eject the data storage device 100 from the bracket 30. Commensurately, the angled surface 741 of the sliding member 70 resists the resisting surface 820 of the resisting member 80, such that the resisting member 80 is moved into the holding space 65 of the latching unit 50 along an arrowhead direction B. The data storage device 100 is thus readily removed from the bracket 30.

In other embodiments, the mounting tab 331 and the resisting tab 334 of the first side plate 33 of the bracket 30 may be omitted, as may the fixing flange 354 and the flange 351 of the second side plate 35. The guiding surface 810 of the resisting member 80 may also be omitted.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a data storage device, the data storage device comprising a post, the mounting apparatus comprising:

a bracket comprising a first side plate defining a sliding groove; and a latching unit mounted to the first side plate and located at the sliding groove, the latching unit comprising a fixing tray fixed to the first side plate, a sliding member slidably mounted in the fixing tray, and a resisting member movably mounted to the sliding member, wherein the resisting member resists the post of the data storage device for preventing the data storage device from disengaging from the bracket;

wherein when the sliding member is slid in the fixing tray along a first direction, the sliding member resists the resisting member to move into the fixing tray along a second direction perpendicular to the first direction; and when the sliding member is slid in the fixing tray along a third direction opposite to the first direction, the resisting member is moved outside the fixing tray along a fourth direction opposite to the second direction.

2. The mounting apparatus of claim 1, wherein the resisting member comprises an angled guiding surface, cooperating with the post of the data storage device to move in or out of the fixing tray.

3. The mounting apparatus of claim 2, wherein the sliding member defines a mounting groove, including an angled surface, and the resisting member comprises an angled rim received in the mounting groove, wherein the angled rim comprises a resisting surface resisting the angled surface.

4. The mounting apparatus of claim 1, wherein the fixing tray defines a holding space, in which a sliding body of the sliding member is slidably received.

5. The mounting apparatus of claim 4, wherein the fixing tray comprises a side panel, a top panel, and a bottom panel extending from a top side and a bottom side of the side panel, the holding space is bounded by the side panel, the top panel, and the bottom panel.

6. The mounting apparatus of claim 5, wherein two fixing boards are formed in the holding space, each defining a sliding slot extending to the side panel, through which the sliding body of the sliding member freely passes.

7. The mounting apparatus of claim 6, wherein the latching unit further comprises a fastening member defining two fixing holes, in which a clamping protrusion extending from each fixing board is correspondingly received.

8. The mounting apparatus of claim 7, wherein the resisting member is sandwiched between the fixing boards, and the fastening member comprises a cover resisting the resisting member.

9. The mounting apparatus of claim 8, wherein the sliding body defines a mounting groove comprising an angled surface, the resisting member comprises an angled rim received in the mounting groove, and the angled rim comprises a resisting surface abutting the angled surface.

10. The mounting apparatus of claim 6, wherein the latching unit further comprises a resilient member located in the holding space, two ends of the resilient member resist the top panel and a top of the resisting member.

11. The mounting apparatus of claim 5, wherein a fixing wall extends from an end of the side panel and connects to the top and bottom panels, and a pushing portion extends from the sliding body, with an opening defined in the fixing wall through which the pushing portion slidably passes.

12. The mounting apparatus of claim 4, wherein a resisting board is formed in the holding space, a mounting shaft extends from the sliding body, and a through hole is defined in the resisting board through which the mounting shaft passes.

13. The mounting apparatus of claim 12, wherein the latching unit further comprises a spring fitting about the mounting shaft, and opposite ends of the spring resist the sliding body and the resisting board.

14. The mounting apparatus of claim 13, wherein the latching unit still further comprises a pushing member pivotally mounted to the fixing tray, and the pushing member comprises a first pushing portion abutting the mounting shaft.

15. The mounting apparatus of claim 14, wherein the fixing tray comprises a top panel and a bottom panel parallel to the top panel, wherein the top and bottom panels bound the holding space, the top panel and the bottom panels each define a shaft hole, and the pushing member comprises two pivoting shafts correspondingly engaged in the shaft holes.

16. The mounting apparatus of claim 14, wherein the pushing member further comprises a second pushing portion, and when the mounting shaft resists the first pushing portion, the pushing member is rotated together with the second pushing member to eject the data storage device.

\* \* \* \* \*